(12) United States Patent
Silveria

(10) Patent No.: US 6,390,665 B1
(45) Date of Patent: May 21, 2002

(54) SPILLAGE PREVENTING BLENDER

(76) Inventor: Mike Silveria, 1020 Aspen, Clean Lake Shore, TX (US) 77565

( * ) Notice: Subject to any disclaimer, the term of this patent is extended or adjusted under 35 U.S.C. 154(b) by 0 days.

(21) Appl. No.: 09/837,212

(22) Filed: Apr. 19, 2001

(51) Int. Cl.[7] .......................... A47J 43/046; B01F 7/16
(52) U.S. Cl. ........................................ 366/307; 366/314
(58) Field of Search ................. 366/192, 205, 366/206, 307, 314; 422/228

(56) References Cited

U.S. PATENT DOCUMENTS

| | | | | |
|---|---|---|---|---|
| 1,709,023 A | * | 4/1929 | Jung | |
| 1,874,079 A | * | 8/1932 | Black | |
| 2,064,861 A | * | 12/1936 | Stroud | |
| 2,070,545 A | * | 2/1937 | Gilbert | |
| 2,315,018 A | * | 3/1943 | Lawrence | |
| 2,757,909 A | | 8/1956 | Wayne | |
| 2,861,785 A | | 11/1958 | DeAngelis | |
| 2,945,634 A | * | 7/1960 | Beck et al. | |
| 3,240,246 A | | 3/1966 | Dewenter | |
| 3,901,484 A | | 8/1975 | Ernster | |
| 4,201,487 A | * | 5/1980 | Backhaus | |
| 4,494,878 A | * | 1/1985 | Rainey, Jr. | |
| 4,747,969 A | * | 5/1988 | McCrory et al. | |
| 4,891,966 A | * | 1/1990 | Kramer | |
| 5,188,808 A | * | 2/1993 | Lilja et al. | |
| 5,323,973 A | * | 6/1994 | Ferrara, Jr. | |

* cited by examiner

Primary Examiner—Charles E. Cooley
(74) Attorney, Agent, or Firm—Patent & Trademar Serv.; Thomas Zack; Joseph H. McGlynn

(57) ABSTRACT

A blender having a container with a motor and spinning blades at the bottom and plastic blades attached to prevent spillage, and an exit port with a control valve.

4 Claims, 3 Drawing Sheets

SPILLAGE PREVENTING BLENDER

BACKGROUND OF THE INVENTION

This invention relates to a blender used to blend solid foods and liquids.

Motor operated blenders with spinning blades are well known and have been used for many years. They have proven themselves very useful for their intended purposes. Normally such blenders have the motor, usually an electrically operated motor, with its blade within a mixing chamber and removable top. When the blending operation is completed, the top is removed and the blended material spilled out into glasses or other containers. For relatively small blending operations this type of upper top openable dispenser is timing consuming to first blend and then dispense the contents. In larger blending operations it would be desirable to have an exit port located near the bottom of the blending container. However, when dispensing mixed products when there is the possibility that spillage may occur. The present invention addresses this problem of spillage.

One blender discloses a container having a motor and spinning blades in the bottom of the container.

Another blender discloses a large capacity blender in which the rotor is held in precise axial alignment with the motor.

In another blender a container has inwardly extending vertical ribs to improve communication.

Still another blender discloses an upper housing member supporting the blender vessel and all of the motor components.

DESCRIPTION OF THE PRIOR ART

Blenders that have motor operated spinning blades are disclosed in the known in the prior art. For example, U.S. Pat. No. 2,757,909 to Wayne discloses a container having a motor and spinning blades in the bottom of the container.

U.S. Pat. No. 2,861,785 to De Angelis discloses a large capacity blender in which the rotor is held in precise axial alignment with the motor.

U.S. Pat. No. 3,240,246 to Dewenter discloses a blender with a container that has inwardly extending vertical ribs to improve comminution.

U.S. Pat. No. 3,901,484 to Ernster discloses a blender with an upper housing member supporting the blender vessel and all of the motor components.

In the present invention a container has a motor with spinning blades at the bottom and plastic blades attached to prevent spillage, and an exit port with a control valve all as will be detailed in the specification that follows hereafter.

SUMMARY OF THE INVENTION

This invention relates to a blender having a container with a motor and spinning blades at the bottom and plastic blades attached to prevent spillage from the top, and an exit port with a control valve.

It is the primary object of the present invention to provide for an improved blender with reduced top spillage when dispensing mixed products.

Another object is to provide for such a blender in which there is a motor having spinning blades at the bottom of the mixing container and plastic blades attached to the mixing chamber to prevent top spillage along with an exit port and control valve.

These and other objects and advantages of the present invention will become apparent to readers from a consideration of the ensuing description and the accompanying drawings.

DESCRIPTION OF THE PREFERRED EMBODIMENT

Figure 1:
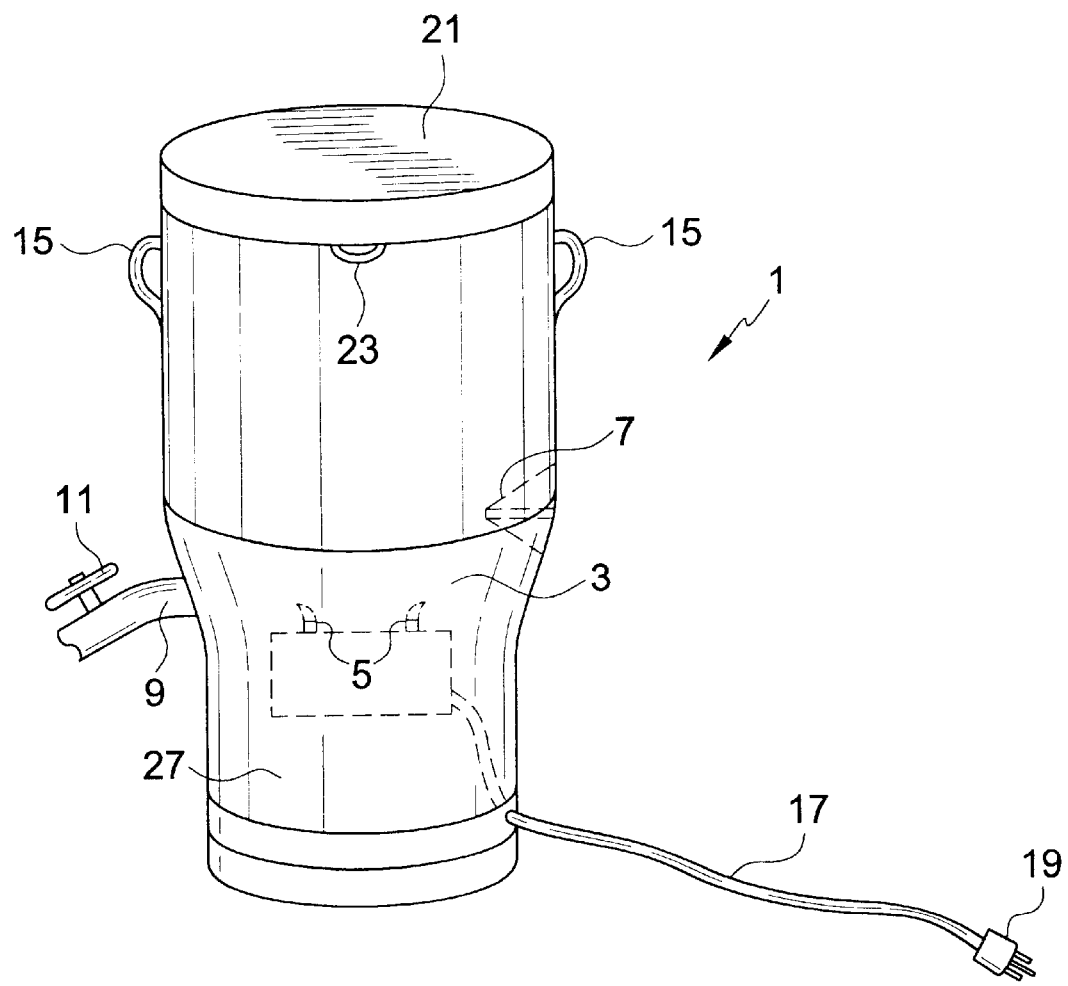
FIG. 1 is a perspective view of the present invention showing the external housing for the container with the internal mixing chamber and blades and plastic blades shown in dotted line format.

FIG. 1 is a perspective view of the present invention showing the external housing for the blender container 1 with the internal mixing chamber 3 and movable blades 5 and wall mounted plastic blades 7 shown in dotted line format. The lower chamber blades 5 spin on a motor driven surface with the electrically powered motor located below the mounting surface. Above these moving blades are the chamber wall mounted blades 7 used to prevent spillage of mixed product in a upward direction. Extending from the body of the container 1 and in communication with the mixing chamber is a side exit port or wall opening 8 with an attached dispensing conduit 9 like a tube. A hand control valve 11 partially extends into the flow path in conduit 9 and acts to control the flow of mixed products, such as liquids, solids and particulate matter in liquids, that have been mixed and can be dispensed from opening 13.

Near the top of container 1 are two opposite side handles 15 used to transport the container and also to store the lower folded electric cord 17 and plug 19. A removable top 21 with its own two side handles 23 (one of which is shown) permits access to the interior of the hollow container 1 and its lower mixing chamber 3. Products to be mixed are inserted into the chamber 3 when this top is removed and then mixed with the top in place on the container. Internally of the container 1 a conventional electrically operated motor 25—shown in dotted line format—is fixed to the internal surface of container 1 below the blades 5 and connect to the power supply cord 17. When in an operative mode, a center shaft on the motor turns or spins the mount for the blades 5 to mix products in the chamber 3. The lower interior portion 27 of the container 1 below the chamber 3 has a generally hollow interior and is not in fluid communication with the mixing chamber 3. This lower volume portion 27 is used to house the motor, its supporting side wall flanges on which mounted along with part of the connecting electric cord 17.

Figure 2:
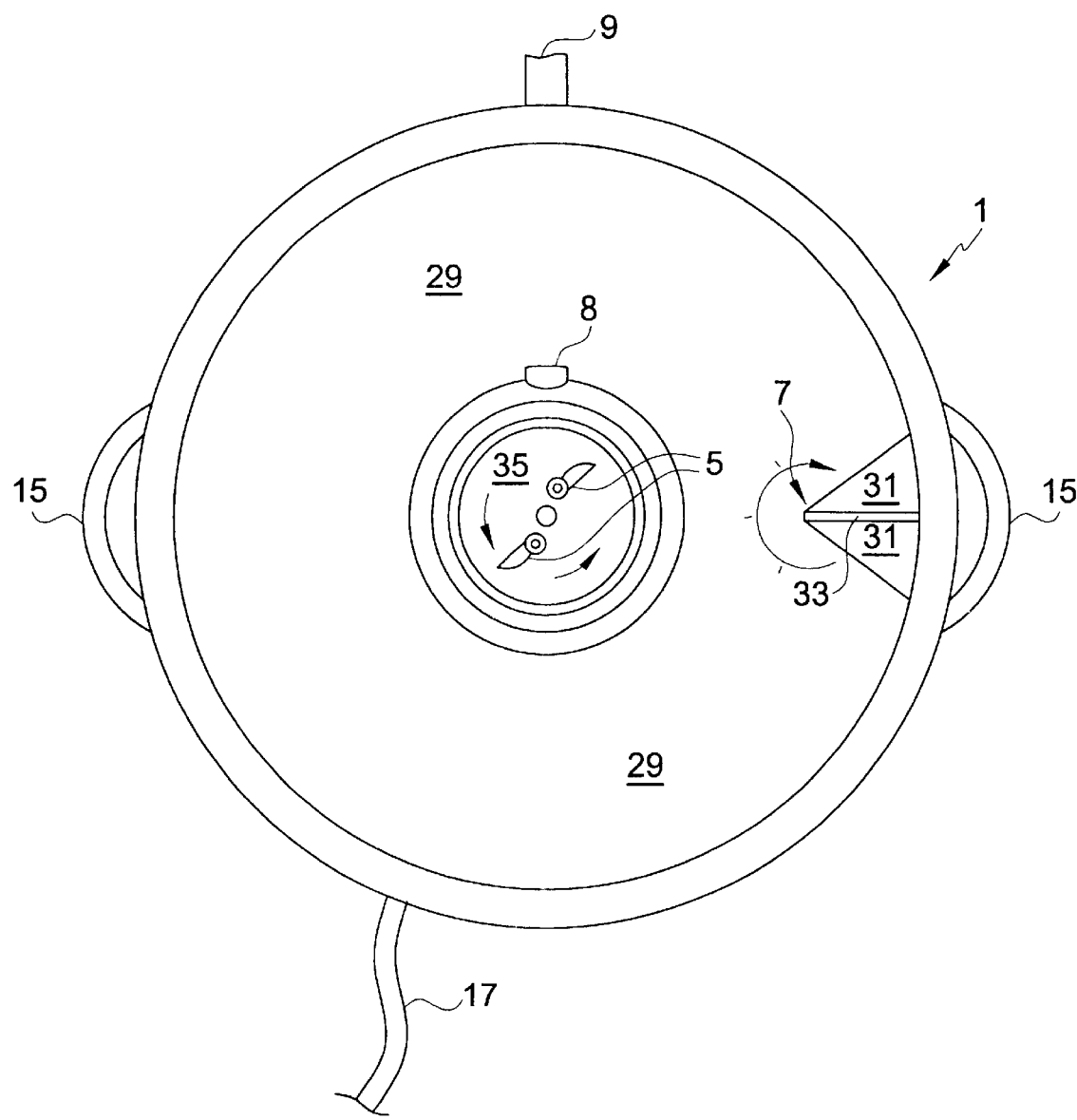
FIG. 2 is a top view of the container of shown in FIG. 1 with the removable top removed to show the plastic blades fixed to the mixing chamber wall with the spinning blades below.

FIG. 2 is a top view of the container 1 with the top 21, shown in FIG. 1, removed to show the chamber's plastic blades 7 fixed to the mixing chamber wall 29 and the spinning blades 5 below. The blades 7 act as deflectors or baffles to both break up particles and to prevent the mixed particles broken up by the spinning lower blades 5 from rising upwardly towards the top of the container 1 and spilling out. The plastic blades 7 are fixed to the side wall 29 and have both horizontal and vertical components oriented at right angles with respect to each other. The horizontal components 31 is a planar surface generally shaped like a triangle with the fin like center vertical component 33 being planar and extending through the components 31 at both its top and bottom sides. As the mixing blades 5 spin on their rotatable mounting surface 35, products deposited on them from above are mixed and move under centrifugal to engage the walls of the chamber.

The port opening 8 which extends through the chamber wall 29 allows the products one mixed to be dispensed through external conduit 9, shown partially. Power to electrically operate the motor located below the mount 35 and connected to it is supplied via partially shown cord 17. The two opposite side handles 15 used to transport the container and also to store the folded core 17 are also shown.

Figure 3:
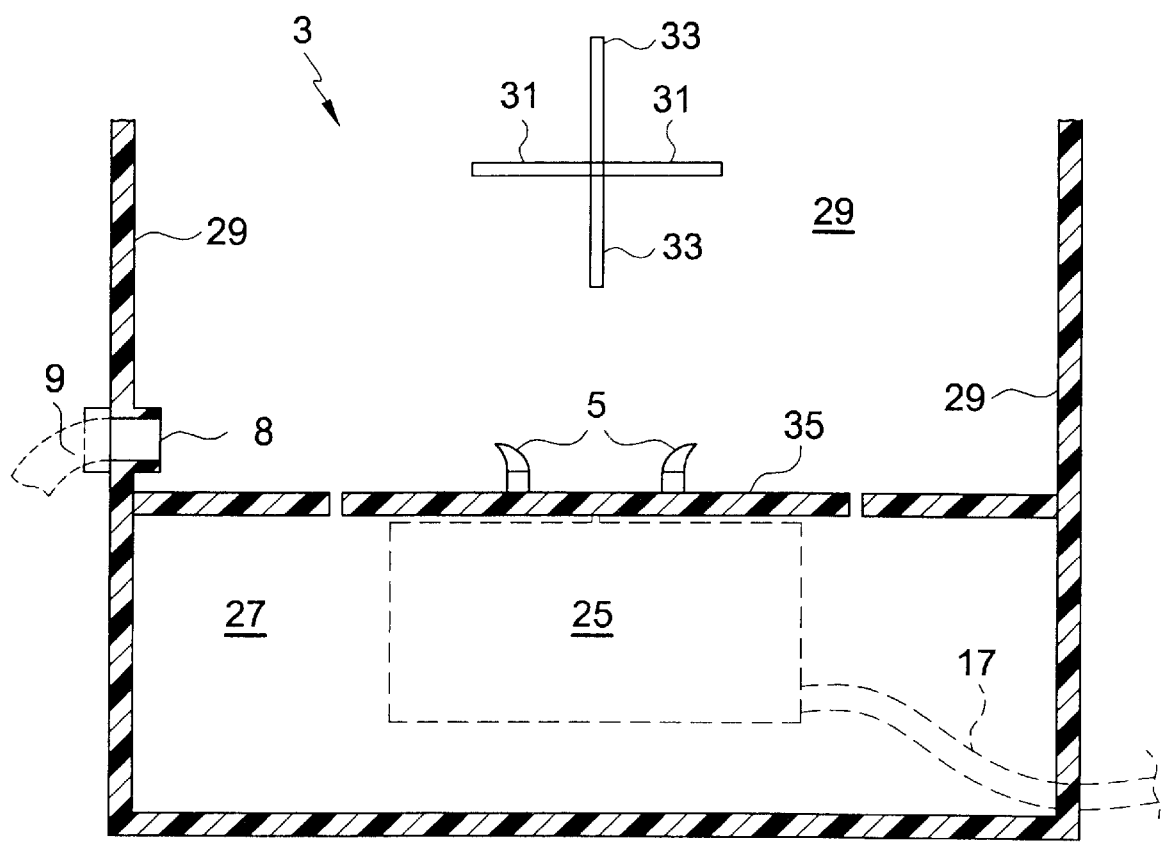
FIG. 3 is cross sectional side view of the internal mixing chamber taken along a line that generally extending across the diameter of the chamber.

FIG. 3 is cross sectional side view of the internal mixing chamber 3 formed by the container walls 29 and lower surfaces as taken along a line extending generally across the diameter of the mixing chamber which line intersects both the exit port 8 and the blades 5. In this view the two perpendicularly intersecting components 31 and 33 of the wall mounted blades 7 are more clearly shown and appear in this view as a cross configuration with equal lengths on each side.

Each of the four blade component 31 and 33 functions to deflect spinning particles they contact as the particles move around in the chamber due to the action imparted to them by lowering rotating blades 5 which rotate relative to the fixed container. The lower conventional electric motor 25 with its power cord 17 as well as the conduit to the opened port 8 are sown in dotted line format. Not all features, such as the wall mounts for the motor, are shown only those necessary to understand the operation of the present invention.

By making the blades 7 with two mutually perpendicular components, spun particles that are moved upwardly are deflected by the horizontal components while horizontally moving particles are deflected by the vertical components of the blades. If desired, more than one such blade 7 could be internally fixed to the walls of the mixing chamber at different locations on the chambers walls above the mixing blades.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A blender comprising:

a container having a mixing chamber, said mixing chamber having a wall and a blade, said blade being driven by a motor mounted to the container, deflector blades fixedly mounted to the wall of the mixing chamber above the blade, said deflector blades comprising a vertical component and a horizontal component with the vertical component and the horizontal component having substantially the same length, said horizontal component being generally triangular in shape and intersected by the vertical component, and an exit port attached to the mixing chamber, said exit port having a control valve.

2. The blender as claimed in claim 1, wherein said motor is electrically powered and mounted below the mixing chamber.

3. The blender as claimed in claim 1, wherein said mixing chamber contains a mounting surface for the blade, said mounting surface being driven by the motor relative to the container.

4. The blender as claimed in claim 1, wherein said mixing chamber has a top opening covered by a removable cover.

\* \* \* \* \*